US007249552B2

(12) United States Patent  
Hines

(10) Patent No.: US 7,249,552 B2  
(45) Date of Patent: Jul. 31, 2007

(54) SAW GUIDE

(76) Inventor: Stephen P. Hines, 1540 Wabasso Way, Glendale, CA (US) 91208

( * ) Notice: Subject to any disclaimer, the term of this patent is extended or adjusted under 35 U.S.C. 154(b) by 0 days.

(21) Appl. No.: 11/295,387

(22) Filed: Dec. 5, 2005

(65) Prior Publication Data

US 2006/0081105 A1    Apr. 20, 2006

Related U.S. Application Data

(62) Division of application No. 10/172,223, filed on Jun. 13, 2002, now abandoned.

(51) Int. Cl.
*B27B 21/00* (2006.01)
*B27G 5/02* (2006.01)

(52) U.S. Cl. .............................. 83/761; 83/454; 83/581; 83/745; 83/821; 83/824; 83/829

(58) Field of Classification Search ................. 83/454, 83/581, 761–767, 820, 821, 823–826, 829, 83/743–745; 33/497, 499, 500; 269/87.1, 269/87.2, 87.3
See application file for complete search history.

(56) References Cited

U.S. PATENT DOCUMENTS

| 577,227 | A | * | 2/1897 | Bolig ........................... 83/760 |
| 2,323,319 | A | * | 7/1943 | Finnell ......................... 83/761 |
| 3,028,888 | A | * | 4/1962 | Chapin et al. ................. 83/761 |
| 3,124,176 | A | * | 3/1964 | Vogini .......................... 33/500 |
| 3,273,612 | A | * | 9/1966 | Keddie .......................... 83/761 |
| 3,273,613 | A | * | 9/1966 | Craven, Jr. ................... 33/450 |
| 3,308,858 | A | * | 3/1967 | DeHart .......................... 83/761 |
| 4,325,278 | A | * | 4/1982 | Beerens ......................... 83/745 |
| 4,627,194 | A | * | 12/1986 | Friel .............................. 51/58 |
| 5,182,975 | A | * | 2/1993 | Warner .......................... 83/745 |
| 5,475,931 | A | * | 12/1995 | Wei .............................. 33/471 |
| 5,687,628 | A | * | 11/1997 | Liao ............................. 83/745 |
| 5,817,097 | A | * | 10/1998 | Howard et al. ............... 606/87 |
| 6,591,725 | B1 | * | 7/2003 | Martin ....................... 83/471.3 |
| 6,607,016 | B2 | * | 8/2003 | Jones .......................... 144/372 |
| 6,829,972 | B2 | * | 12/2004 | Chen ........................... 83/761 |
| 2003/0041709 | A1 | * | 3/2003 | Jones ............................ 83/13 |
| 2004/0149112 | A1 | * | 8/2004 | Snell ........................... 83/745 |

* cited by examiner

*Primary Examiner*—Clark F. Dexter
(74) *Attorney, Agent, or Firm*—James E. Brunton, Esq.

(57) ABSTRACT

A guide for use with a cutting member, such as hand saws, that is easy to use, is readily portable and can be adjusted to permit cutting of precise compound angles on work pieces of various configurations. The guide mechanism comprises two angularly related members arranged so that when one member engages the face of a work piece, the other member functions to glidably engage a cutting member, such as the blade of a hand saw with the teeth thereof in cutting relation with said face of the work piece. In one form of the invention, locking mechanisms are provided to lock the member in any selected angular relation and a magnet is carried by the guide member which uniquely functions to continuously urge the saw into engagement with a plurality of rollers that are also carried by the guide member.

7 Claims, 9 Drawing Sheets

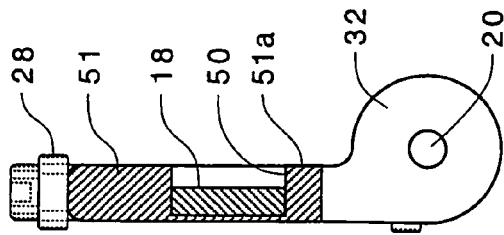
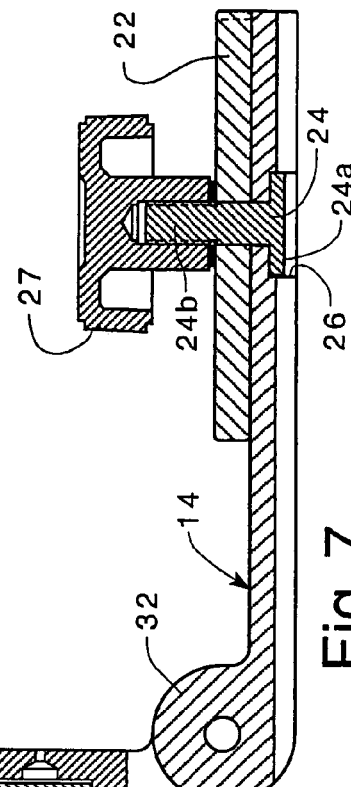
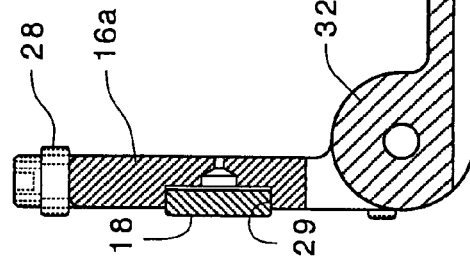
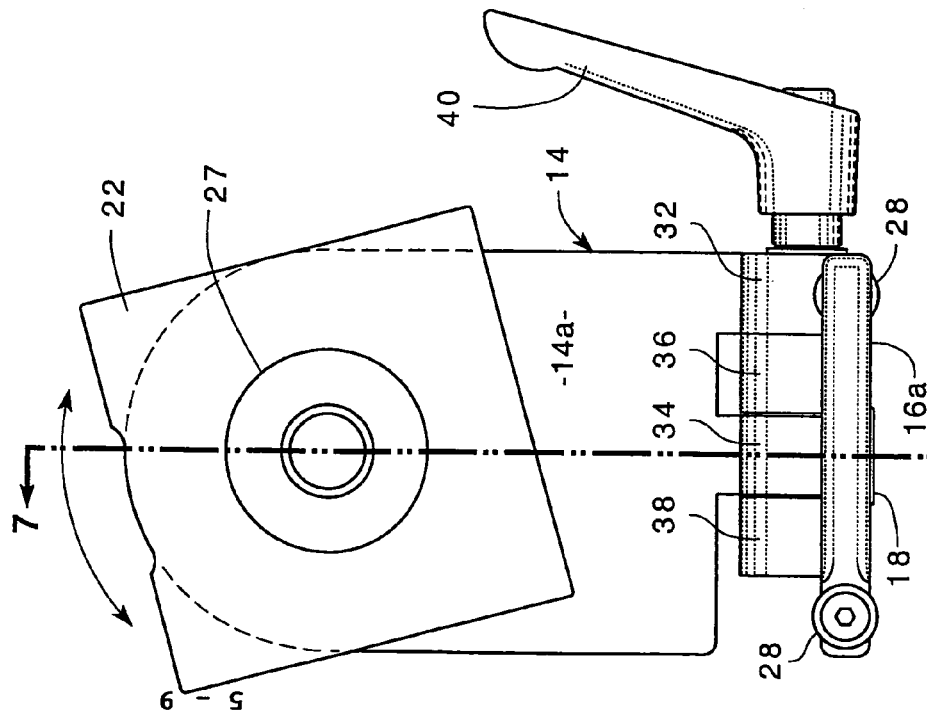

SAW GUIDE

BACKGROUND OF THE INVENTION

This is a Divisional Application of application Ser. No. 10/172,223 filed Jun. 13, 2002 now abandoned.

FIELD OF THE INVENTION

The present invention relates generally to guide mechanisms for guiding cutting members such as knives and saws. More particularly, the invention concerns a novel saw guide mechanism that is precisely adjustable to enable cutting of various types of work pieces at a variety of angles, including compound angles.

DISCUSSION OF THE PRIOR ART

The prior art is replete with various types of guide mechanisms for guiding cutting members, including handsaws, power saws, saber saws and the like. Such guide mechanisms typically employ a protractor having a 180-degree adjustment range. Various forms of miter boxes, miter vises and mitering machines are also known.

Quite commonly used in the woodworking field is the simple miter box which may be attached to a bench, or fitted in a vice, and will receive the work piece to be cut. The miter box usually provides a guide for the saw while cutting either at right angles or at an angle of 45 degrees to an edge of the work piece and in some instances includes 60 degree and 30 degree cuts. These prior art miter boxes are rather bulky, are somewhat imprecise and are difficult to use.

As a general rule, the prior art equipment that is capable of making precise cuts, including cuts at compound angles, is quite expensive and typically the woodworking hobbyist or professional woodworker, must make a substantial investment in several different pieces of equipment to satisfy even the most common needs for making precision cuts on work pieces.

Additionally, much of the prior art equipment is suitable only for processing plain, rectangular work pieces and is not capable of handling work pieces such as round stock and the like.

As will be better appreciated from the description which follows, the guide mechanism, or saw guide, of the present invention provides several unique features not found in the prior art. For example, the guide mechanism, or saw guide, includes two angularly related members one of which engages the work piece and the other of which, namely a guide member or bevel plate, precisely guides the travel of the cutting member. The bevel plate uniquely carries a plurality of rollers that support the cutting member as the cutting member, such as a saw blade is reciprocated relative to the work piece. The bevel plate also carries magnetic means that functions to continuously urge the cutting member toward the bevel plate and into engagement with the plurality of rollers. With this novel construction, the cutting member, such as a hand saw, can be smoothly and accurately reciprocated relative to the work piece to accomplish precise cuts with smoothness and precision.

SUMMARY OF THE INVENTION

It is an object of the present invention to provide a guide for use with cutting member such as hand saws that is easy to use, is readily portable and can be adjusted to permit cutting of precise compound angles on work pieces of various configurations. More particularly, it is an object of the invention to provide a guide mechanism of the aforementioned character that comprises two angularly related members arranged so that when one member engages the face of a work piece, the other member functions to guidably engage a cutting member, such as the blade of a hand saw with the teeth thereof in cutting relation with said face of the work piece. Means are also provided to lock the members in any selected angular relation.

Another object of the invention is to provide a guide of the character described in the preceding paragraph in which magnetic means carried by the guide member, or bevel plate, function to continuously urge the hand saw into engagement with a plurality of rollers that are also carried by the bevel plate. These uniquely positioned rollers function to permit the hand saw to be smoothly and accurately reciprocated relative to the guide member and the work piece during the sawing operation.

Another object of the invention is to provide a guide of the character described in which magnetic means carried by the guide member function to continuously urge the hand saw into engagement with a low friction component that is also carried by the guide member. The low friction component, that may take the form of a low friction plastic, functions to permit the hand saw to be smoothly reciprocated relative to the guide member during the sawing operation.

Another object of the invention is to provide a guide of the class described that includes adjustment means that permits the precise adjustment of the angle of the base member relative to the edge of the work piece.

Another object of the invention is to provide a guide as described in the preceding paragraph that further includes locking means for locking the base member in a selected, angular orientation relative to the edge of the workpiece.

Another object of the invention to provide a guide mechanism that comprises two angularly related members arranged so that when one member engages the face of a workpiece, the other member functions to guidably engage the blade of either a saw or a knife with the cutting edge thereof disposed in cutting relation with said face of the work piece.

BRIEF DESCRIPTION OF THE DRAWINGS

FIG. 6 is a top plan view of the guide shown in FIGS. 1 and 2.

FIG. 7 is a cross-sectional view taken along lines 7-7 of FIG. 6.

FIG. 10 is a cross-sectional view of the guide member shown in FIGS. 8 and 9.

DESCRIPTION OF THE INVENTION

Figure 1:
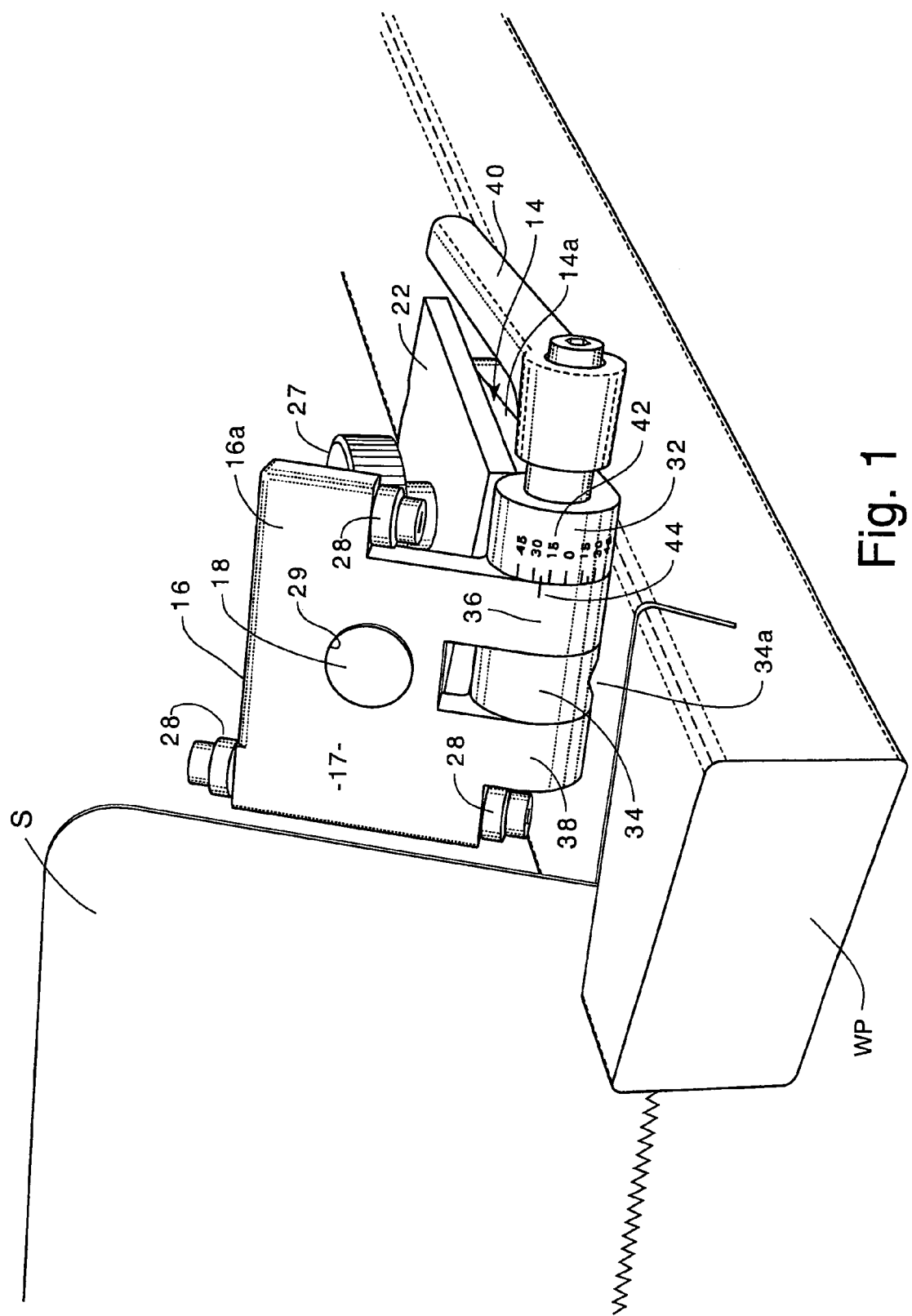
FIG. 1 is a generally perspective, front view of one form of the guide mechanism of the present invention for guiding the travel of a cutting member, such as a saw blade constructed of a ferrous metal.

Referring to the drawings and particularly to FIGS. 1-7, one form of the guide mechanism of the present invention for guiding the travel of a cutting member, such as a ferrous metal hand saw "S" is there shown. In this form of the invention, the apparatus comprises a base assembly 14 and a guide member assembly or bevel plate assembly 16 that is pivotally connected to base assembly 14 and extends outwardly therefrom. Guide member assembly 16 functions to guide the travel of cutting member "S" as it is reciprocated between a first position shown in FIG. 1 and a second position shown in FIG. 2. A unique feature of the apparatus of the present invention resides in the provision of magnetic means, here shown as a magnet 18, that is carried by guide member or bevel plate 16a of guide member assembly 16. This important magnetic means functions to urge the saw blade "S" toward the guide member 16a.

Figure 3:
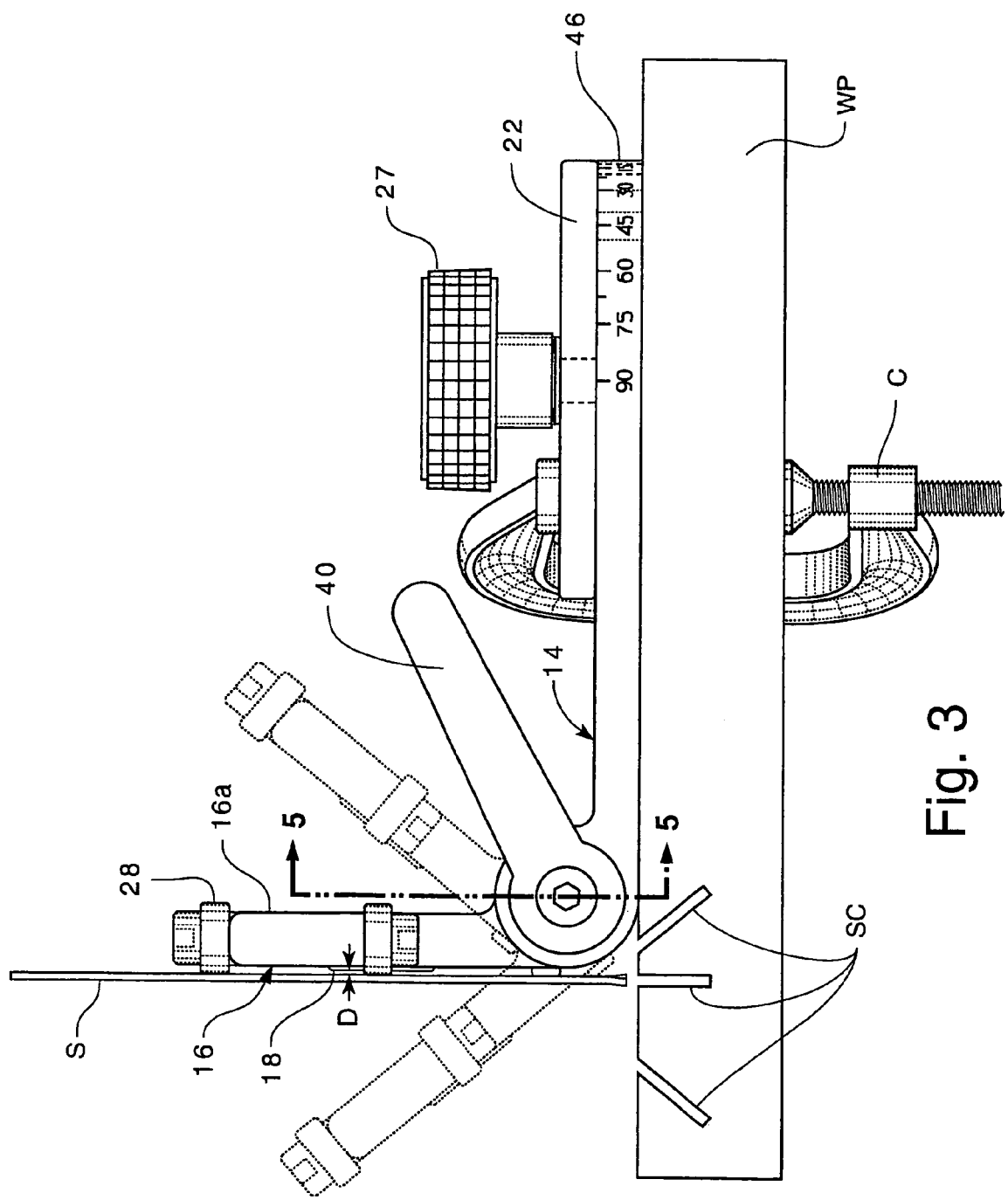
FIG. 3 is a side-elevational view of the guide mechanism shown in FIG. 1.
Figure 5:
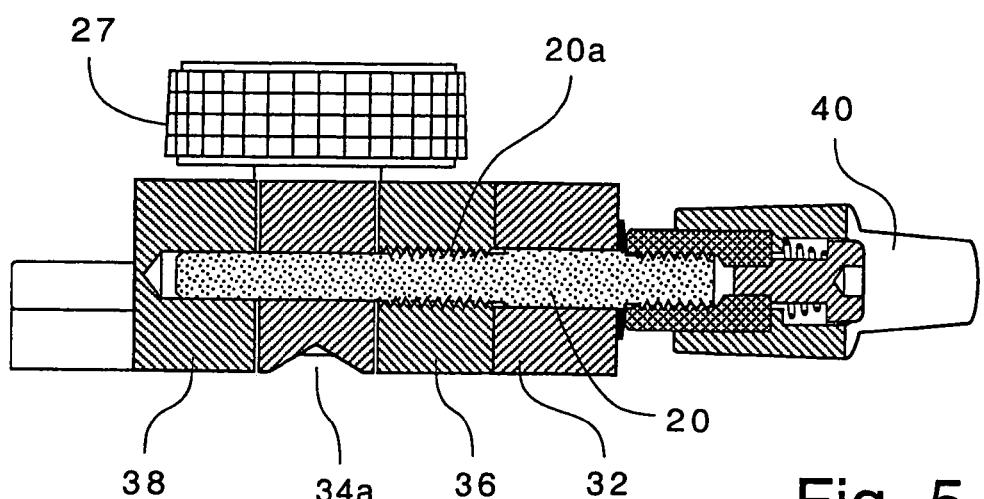
FIG. 5 is a cross-sectional view taken along lines 5-5 of FIG. 3.

As illustrated in FIG. 3, bevel plate 16a is pivotally connected to base assembly 14 for movement between a first position shown by the solid lines in FIG. 3 and second and third positions shown by the phantom lines in FIG. 3. First locking means, which are operably associated with base assembly 14, function to lock bevel plate 16a in any selected position anywhere within its angular range. As best seen in FIG. 5, this first locking means here comprises a shaft, or hinge pin 20, that is rotatably carried by the base assembly 14 and guide assembly 16 in a manner presently to be described.

Another important feature of the apparatus of the present invention is a miter plate 22 rotatably connected to base assembly 14 so that the miter plate 22 can be selectively rotated in the manner illustrated in FIG. 6 of the drawings. As indicated in FIG. 7, the miter plate 22 rotates relative to base plate 14a about a miter plate post 24. Miter plate post 24 has a base portion 24a that is received within a recess 26 formed in the base plate and an upper threaded portion 24b. Threadably interconnected with upper threaded portion 24b of plate post 24 is a miter plate tightening handle 27. Miter plate tightening handle 27, along with miter plate post 24 comprise the second locking means of the invention for locking the miter plate in selected positions. More particularly, as is clear from a study of the drawings, by tightening miter plate tightening handle 27, the miter plate will be moved into pressural engagement with the base plate in a manner to prevent rotation of the miter plate relative to the base plate.

Another important feature of the guide mechanism of the present invention is interface means carried by guide member or bevel plate 16a for providing an interface between the bevel plate and the cutting member or saw blade "S". In one form of the invention, this important interface means comprises a plurality of rollers 28 that are mounted on guide member 16a in the manner illustrated in FIGS. 1, 2 and 4. Rollers 28, which are rotatably mounted on conventional roller bearings connected to guide member 16a, extend outwardly from the front face 17 of guide member 16a so as to rollably engage and support saw blade "S" in the manner indicated in FIG. 3 as the saw blade reciprocates relative to the work piece. As also shown in FIGS. 3 and 7, magnet 18 extends outwardly from the front face 17 of guide member 16a and functions to pull or urge the saw blade into pressural contact or engagement with the rollers 28 thereby maintaining the saw blade "S" in a stable plane with respect to the guide member. Magnet 18, which is of conventional construction, can be connected to guide member 16a in any appropriate manner, such as, for example, by using an appropriate adhesive, such as an epoxy, bonding the magnet into a counterbore 29 formed in the bevel plate. Preferably, magnet 18 is bonded into counterbore 29 in the manner shown in FIGS. 1 and 7 so that the front surface the magnet is spaced from the saw blade "S" a distance "D" of approximately 0.02 inches.

Turning once again to FIG. 1, it is to be noted that base plate 14a has a pair of spaced-apart first hinge sections 32 and 34 that are integrally formed with base plate 14a. In similar fashion, bevel plate 16a is provided with spaced-apart second hinge sections 36 and 38 that are integrally formed with bevel plate 16a. Hinge sections 32 and 34 are maintained in axial alignment with hinge sections 36 and 38 by the previously identified shaft or hinge pin 20 (see FIG. 5). With this construction, it is apparent that bevel plate 16a can be pivoted relative to base plate 14a into the positions shown in FIG. 3 with the hinge sections and hinge pin functioning in the manner of a conventional hinge.

Turning particularly to FIGS. 1 and 5, it is to be noted that shaft, or hinge pin 20, includes an externally threaded, central portion 20a. Similarly, hinge section 36 of bevel plate 16a is provided with internal threads that threadably receive the threaded portion 20a of shaft 20. Affixed to the outboard end of shaft 20 is a tightening handle 40 which, when rotated by the operator, will clamp hinge sections 32 and 36 together in a manner to lock the bevel plate in a selected angular position relative to base plate 14a. Tightening handle 40, along with threaded shaft 20, comprise the previously identified first locking means of the invention for locking the bevel plate assembly in the first, second and third positions shown in FIG. 3. As best seen in FIG. 1, hinge section 32 is provided with a bevel angle scale 42 and hinge section 36 is provided with a bevel angle index mark 44 that can be indexably aligned with selected indicia 42a of the bevel angle scale 42. This indexing means permits the guide member 16a to be precisely angularly aligned with respect to the base plate at a determinable angle as indicated by the indicia 42a (FIG. 4) of the bevel angle scale 42.

Figure 2:
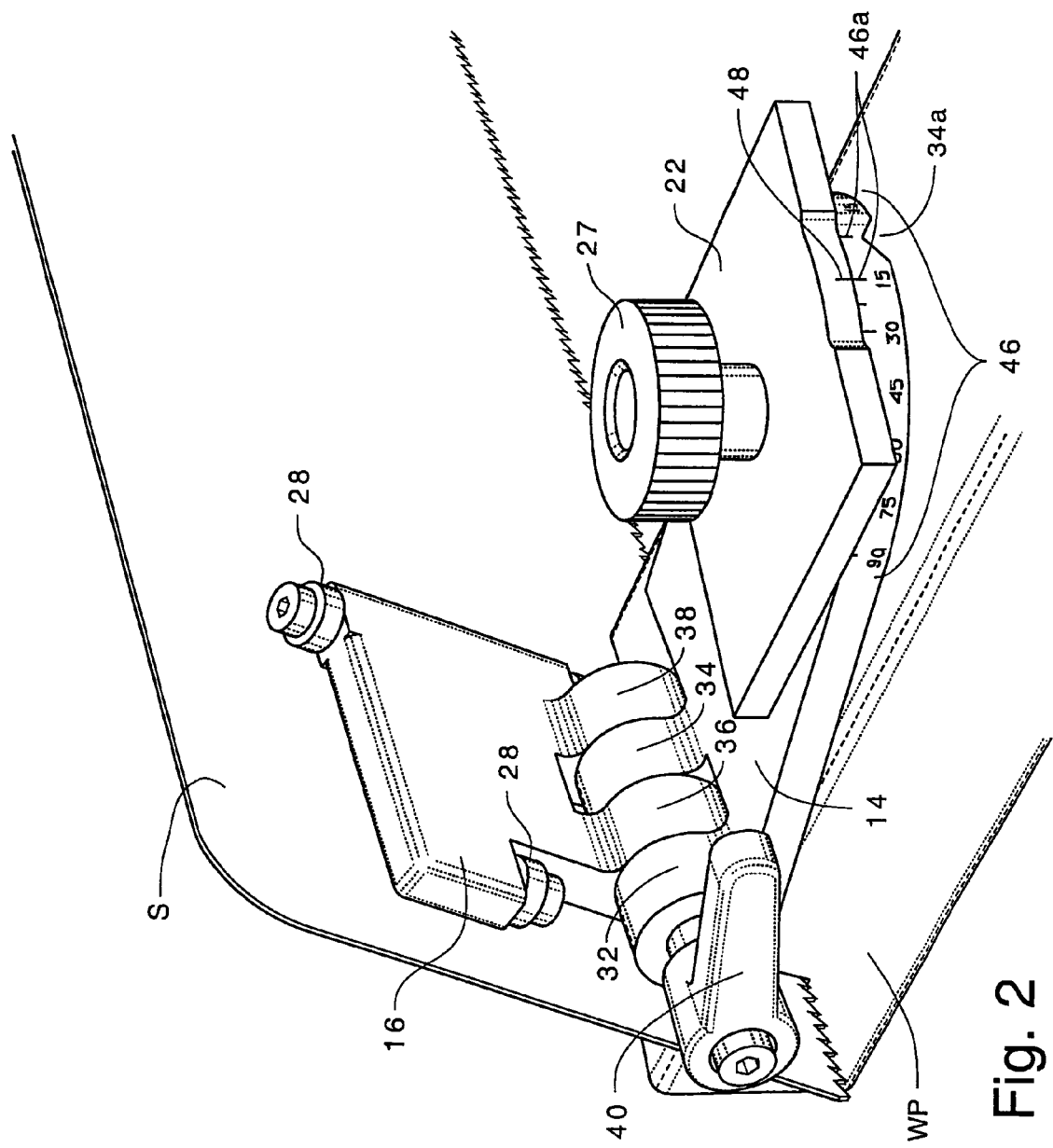
FIG. 2 is a generally perspective, rear view of the guide mechanism shown in FIG. 1.

Turning to FIG. 2, it is to be observed that base plate 14a is provided with a miter plate angle scale 46 and miter plate 22 is provided with a miter plate index mark 48 that can be indexably aligned with a selected indicia 46a of the miter plate angle scale 46. With this arrangement, when the miter plate tightening handle 27 is loosened, miter plate 22 can be positioned relative to base assembly 14 so that the miter plate index mark 48 can be readily aligned with the selected one of the indicia 46a of the miter plate angle scale 46 provided on the base plate 14a.

In using the apparatus of the invention shown in FIGS. 1-7, the miter plate 22 is interconnected with the work piece "WP" by means of a conventional C-Clamp "C" (FIG. 3). Using the miter plate angle scale 46 and the miter plate index mark 48, the base plate assembly 14 can be positioned at the desired angle with respect to the edge of the work piece and can be locked in this position with respect to the miter plate by tightening the miter plate tightening handle 27. It is apparent that the miter plate can be adjusted relative to the base plate to permit a cut that is perpendicularly aligned with the edges of the work piece, or, alternately, at a selected angle with respect to the edges of the work piece as depicted in FIG. 2. With the angle of the base plate suitably selected, as shown in FIG. 1, the angle of the bevel plate 16a can be similarly adjusted by loosening bevel plate tightening handle 40 and then using the bevel angle scale 42 and the bevel angle index mark 44, the bevel plate 16a can be pivoted relative to the base so as to select the desired bevel angle of cut of the saw blade. In this regard, it is to be observed that this angle can be varied from 0 degrees at which the saw blade will form a vertical cut in the work piece to any selected angle at which the saw blade will form angular saw cuts "SC" of the character illustrated in FIG. 3. After the bevel angle of cut has been selected, the bevel plate tightening handle 40 is tightened to lock the bevel plate in the selected position.

With the base plate 14a and the bevel plate 16a appropriately aligned and C-clamped to the work piece "WP", the saw blade can be moved into engagement with the rollers 28 of the roller means in the manner shown in FIG. 3. In this position, magnet 18 will continuously pull the saw blade into contact with the roller bearings thereby providing a smooth, stable reciprocal rolling motion of the saw blade relative to the work piece.

Figure 4:
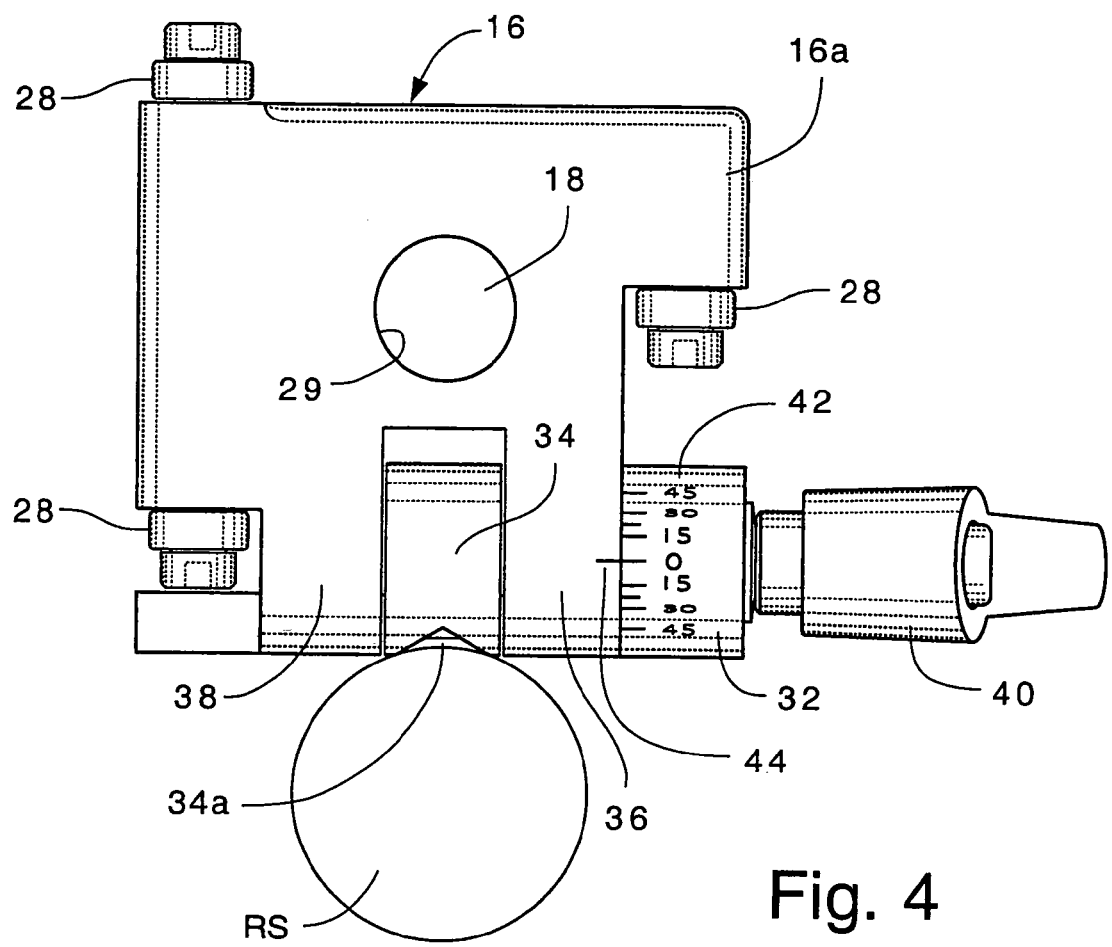
FIG. 4 is a front view of the guide mechanism shown in FIG. 1 being used to cut a piece of round stock rather than the rectangular shaped work piece shown in FIGS. 1, 2, and 3.

As indicated in FIGS. 1, 4 and 5, when the workpiece to be cut comprises round stock "RS", a V-groove 34a formed in the base plate 14a, including hinge section 34, functions to align the workpiece.

Figure 8:
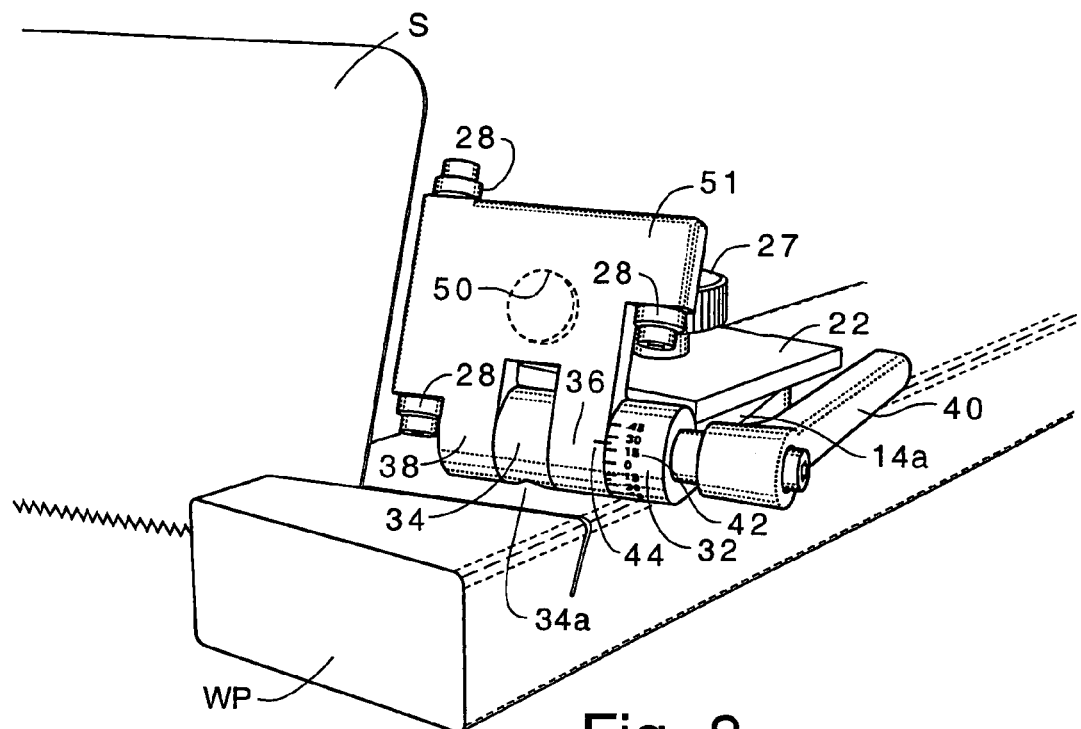
FIG. 8 is a generally perspective, front view of an alternate form of the guide of the invention, which is similar to that shown in FIG. 1, but in which the magnet component is mounted in a different manner.
Figure 9:
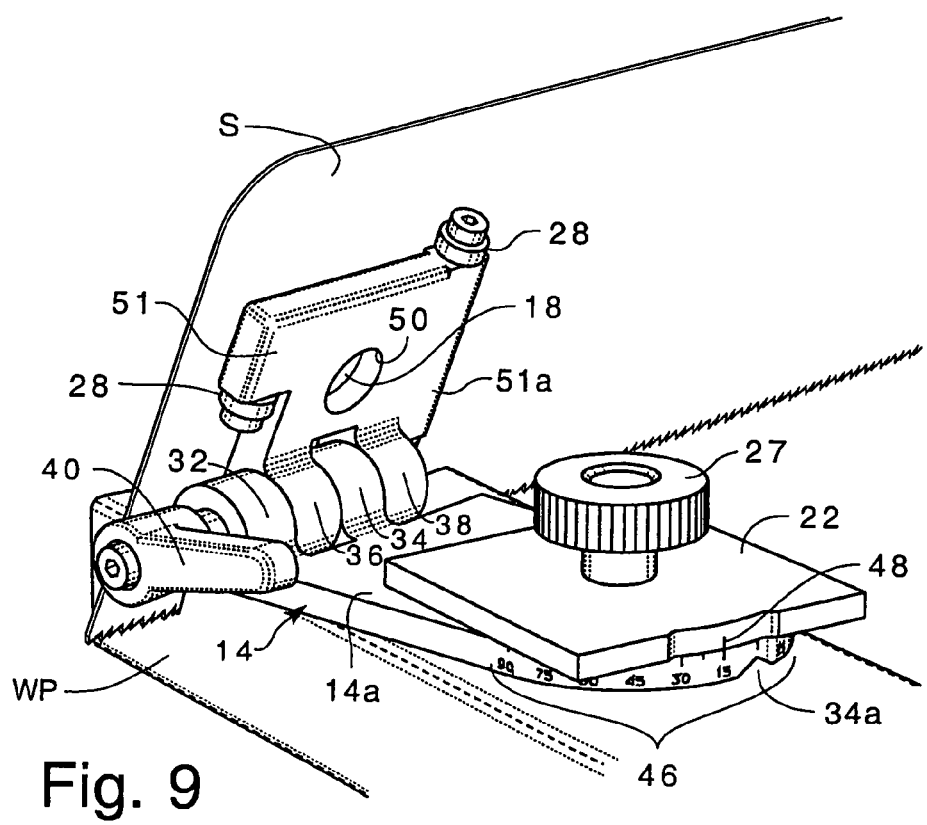
FIG. 9 is a generally perspective, rear view of the alternate form of the apparatus shown in FIG. 8.

Turning to FIGS. 8, 9 and 10, an alternate form of the guide mechanism of the present invention is there shown. This form of the invention is similar in most respects to that shown in FIGS. 1 through 7 and like numerals are used in FIGS. 8, 9 and 10 to identify like components. The primary difference in the embodiment shown in FIGS. 1-7 and that shown in FIGS. 8 through 10 resides in the fact that the magnet 18 is received within a counterbore 50 provided in the rear surface 51a of the guide member 51 (FIG. 10). With this construction, when the guide mechanism is in use, the magnet is continuously pulled into counterbore 50 due to the tug of the saw blade as it travels along the roller means.

Figure 11:
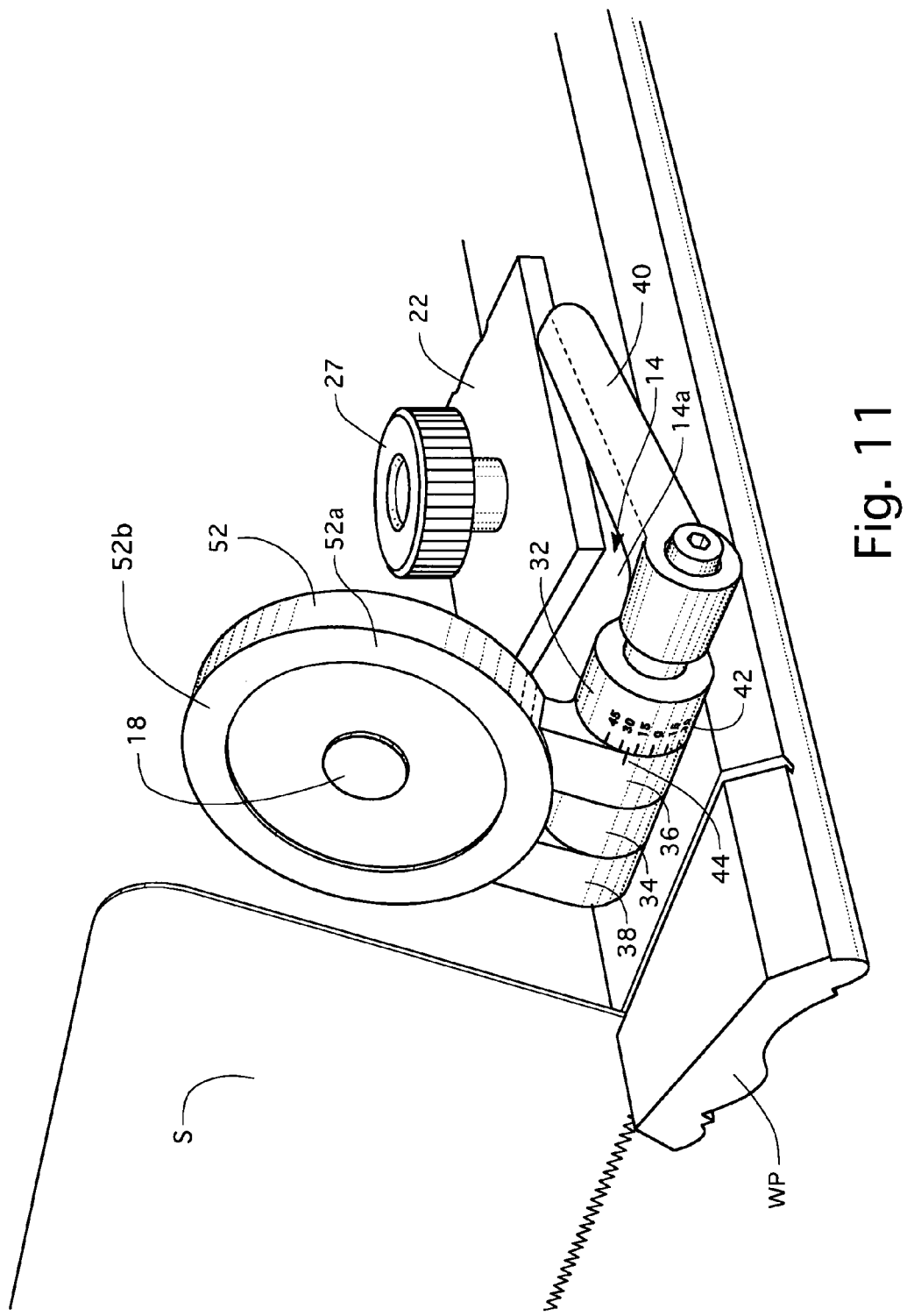
FIG. 11 is a generally perspective, front view of still another form of guide mechanism of the invention.

Referring to FIG. 11, still another form of the guide mechanism of the present invention is illustrated being used to cut a crown molding. Once again, this mechanism is similar in most respects to that shown in FIGS. 1-10 and like numerals are used to identify like components. The principal difference between this latest embodiment and the earlier described embodiment resides in the configuration of the guide member or bevel plate 52 molded of a low friction plastic which here is generally circular in shape and is provided at its periphery with a generally circular-shaped raised saw-support rim 52a, the rim 52a forming a substantially planar guide surface 52b, wherein the guide member 52 is configured to support a substantially planar surface of the saw S that extends across the entire guide surface 52b. As shown in FIG. 11, a centrally located raised magnet 18 is provided within the rim 52a. During the cutting operation, the saw blade will be supported by the guide surface 52b of the rim 52a, which will enable the smooth reciprocal movement of the saw blade.

Figure 12:
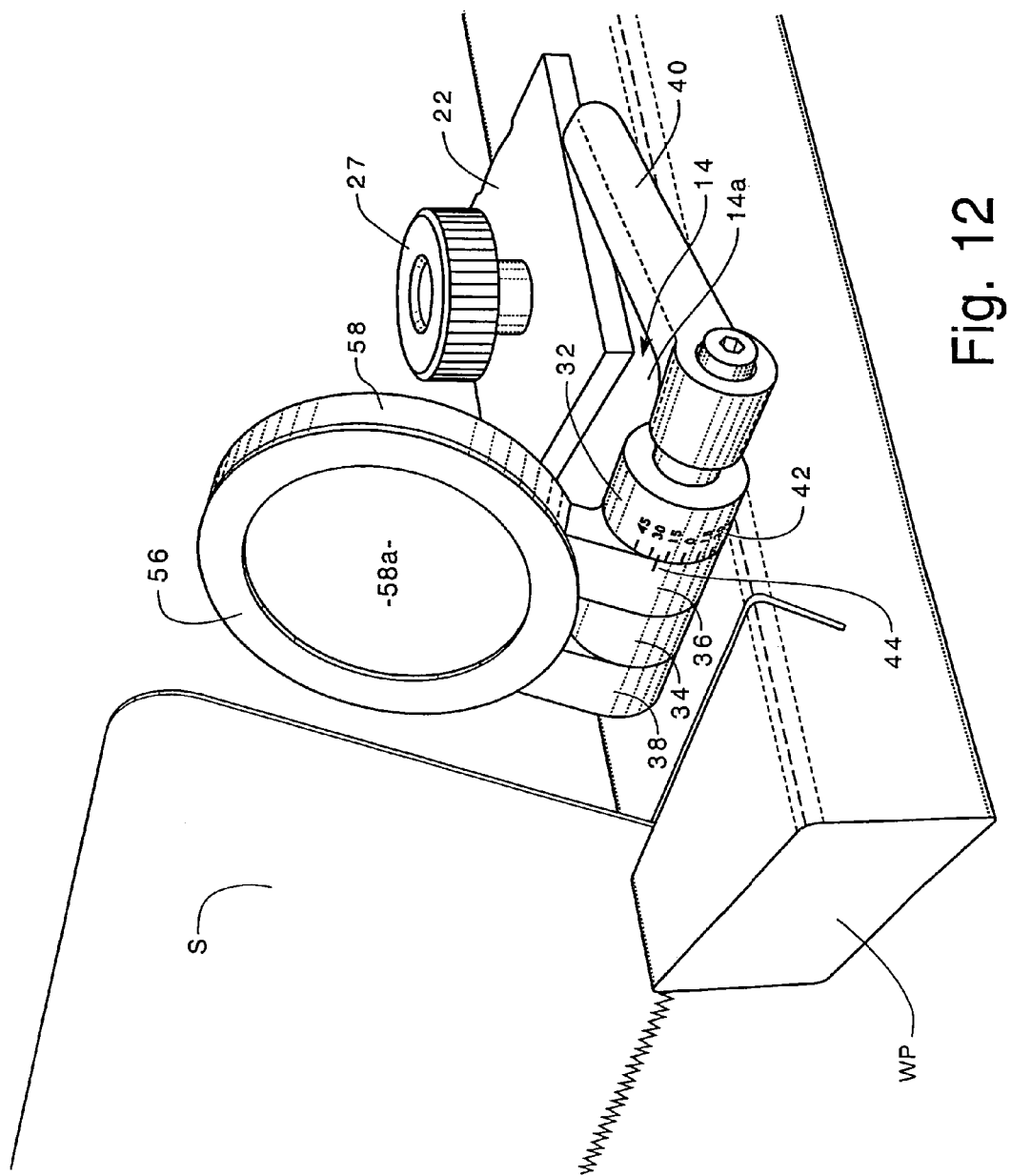
FIG. 12 is a generally perspective, front view of another form of guide mechanism of the invention.

Turning to FIG. 12, yet another form of the guide mechanism of the present invention is there illustrated. This mechanism is similar to that shown in FIG. 11 and like numerals are used to identify like components. The principal difference between this latest embodiment and that shown in FIG. 11 resides in the fact that the centrally located magnet has been replaced by a magnetic rim 56 which circumscribes the front face 58a of the guide member 58 in the manner shown in FIG. 12. During the cutting operating, the magnetic rim will continuously pull the saw blade into slidable contact with magnetic rim 56.

Figure 13:
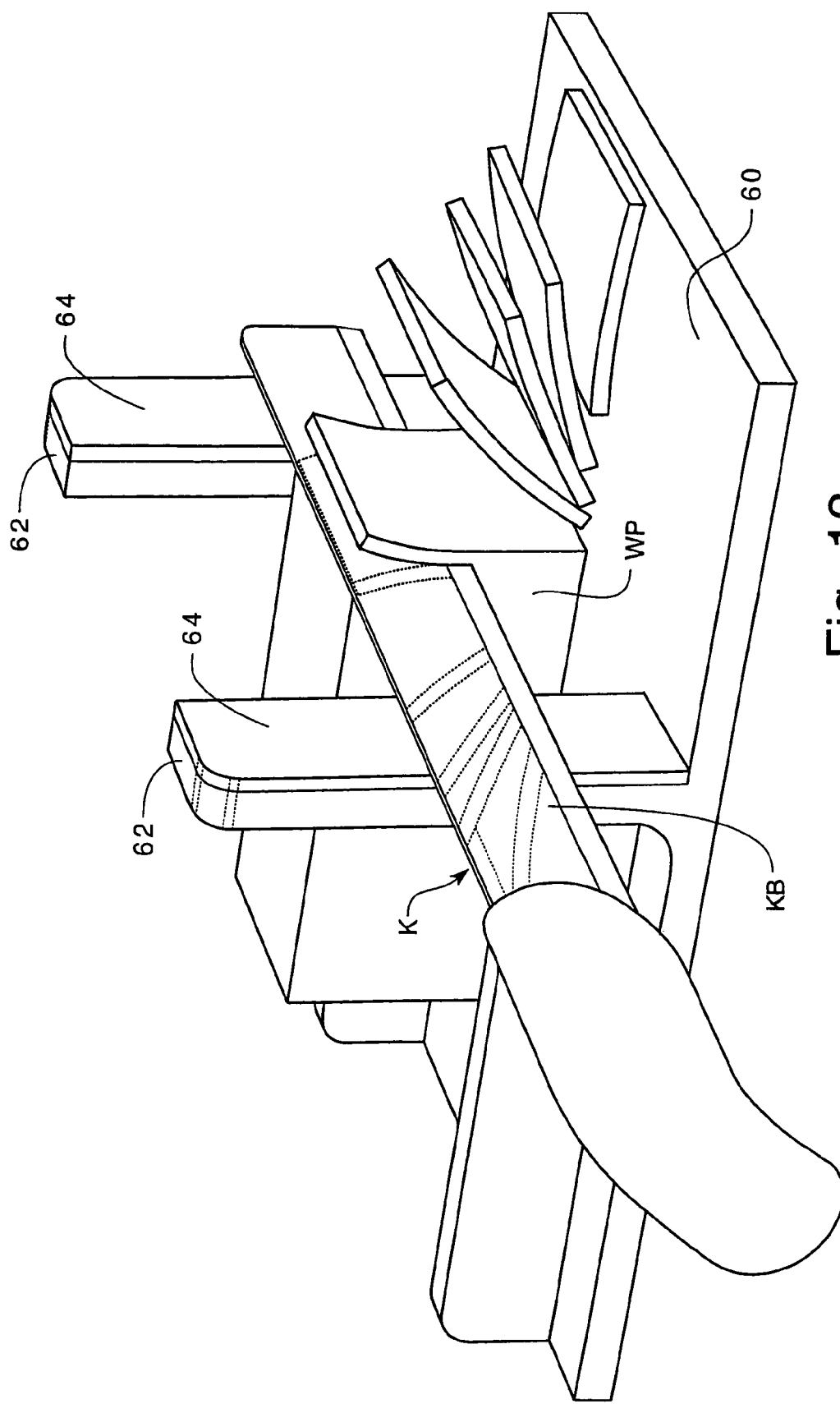
FIG. 13 is a generally perspective view of another guide mechanism of the present invention.

Turning to FIG. 13, another guide mechanism of the present invention is there illustrated. This mechanism, which is adapted to be used with a knife "K" rather than with a saw blade, comprises a base 60 and a pair of spaced apart guide members 62 that are connected to base 60 and extend upwardly therefrom. The magnetic means of this latest form of the invention comprise a pair of magnetic strips 64 that are affixed to guide members 62 in a manner shown in FIG. 13.

In using the apparatus of this latest form of the invention, the knife blade "KB" of the knife "K", which is constructed from a ferrous metal, is continuously pulled into contact with the magnetic strips 64 and toward the guide members so that during the cutting operation the knife blade reciprocally slides smoothly along the magnetic strips to precisely cut the work piece "WP" in the manner illustrated in FIG. 13.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following documents.

I claim:

1. A guide for guiding the travel of a cutting member constructed of a ferrous metal, comprising:
   (a) a base;
   (b) a generally circular-shaped guide member connected to said base and extending outwardly therefrom for guiding the travel of the cutting member as the cutting member is reciprocated between first and second cutting positions, said guide member including a generally circular-shaped raised rim forming a substantially planar guide surface, wherein the guide member is configured to support a substantially planar surface of the cutting member that extends across the entire guide surface; and
   (c) a magnet carried by said guide member for urging the metal cutting member toward said guide surface.

2. The guide as defined in claim 1 in which said guide member is pivotally connected to said base for pivotal movement relative to said base between a first and a second guiding position.

3. The guide as defined in claim 2, further including locking means operably associated with said base for locking said guide member in one of said first and second guiding positions.

4. The guide as defined in claim 2 in which said generally circular-shaped guide member is connected to said base for angular movement relative thereto.

5. The guide as defined in claim 2 in which said generally circular-shaped guide member is constructed from a low-fiction plastic material.

6. A guide for guiding the travel of a cutting member constructed of a ferrous metal, comprising:
   (a) a base;
   (b) a generally circular-shaped guide member connected to said base and extending outwardly therefrom for guiding the travel of the cutting member as it is reciprocated between first and second cutting positions, said guide member including a generally circular-shaped raised rim forming a substantially planar guide surface, wherein the guide member is configured to support a substantially planar surface of the cutting member that extends across the entire guide surface, said guide member being connected to said base for angular movement relative to said base between first and second guiding positions;

(c) a magnet carried by said guide member for urging the metal cutting member toward said guide surface; and (d) locking means operably associated with said base for locking said guide member in one of said first and second guiding positions.

7. The guide as defined in claim 6 in which said raised rim portion comprises a low friction plastic component.

* * * * *